(12) United States Patent
Ito et al.

(10) Patent No.: US 6,777,485 B1
(45) Date of Patent: Aug. 17, 2004

(54) CURABLE RESIN COMPOSITION

(75) Inventors: Hiroshi Ito, Takasago (JP); Hidetoshi Odaka, Takasago (JP); Hiroshi Iwakiri, Kobe (JP); Fumio Kawakubo, Kobe (JP); Hideharu Jyono, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/868,657

(22) PCT Filed: Dec. 28, 1999

(86) PCT No.: PCT/JP99/07367

§ 371 (c)(1),
(2), (4) Date: Nov. 7, 2001

(87) PCT Pub. No.: WO00/40654

PCT Pub. Date: Jul. 13, 2000

(30) Foreign Application Priority Data

Jan. 5, 1999 (JP) .......................................... 11/000645

(51) Int. Cl.$^7$ ............................................. C08L 83/12
(52) U.S. Cl. .......................... 524/588; 528/15; 528/25; 156/329
(58) Field of Search ........................... 524/588; 528/15, 528/25; 156/329

(56) References Cited

U.S. PATENT DOCUMENTS

| | | | | |
|---|---|---|---|---|
| 4,323,488 A | * | 4/1982 | Takago et al. ................ 528/32 |
| 4,906,707 A | * | 3/1990 | Yukimoto et al. .......... 525/403 |
| 4,983,700 A | * | 1/1991 | Yukimoto et al. ............ 528/34 |
| 5,223,583 A | * | 6/1993 | Higuchi et al. .............. 525/404 |
| 5,424,383 A | * | 6/1995 | Kimura et al. ................ 528/12 |
| 5,648,427 A | * | 7/1997 | Fujita et al. ................. 525/104 |

FOREIGN PATENT DOCUMENTS

| EP | 0 693 513 A2 | | 1/1996 | |
|---|---|---|---|---|
| EP | 856569 A1 | * | 8/1998 | ............ C09K/3/10 |

OTHER PUBLICATIONS

English Translation of JP 05–12573 obtained from the JPO website, Watabe et al. May. 1993.*
English Translation of JP 05–222284 obtained from the JPO website, Yanase et al. Aug. 1993.*
English Translation of JP 06–279693 obtained from the JPO website, Yamamoto et al. Oct. 1994.*

* cited by examiner

Primary Examiner—Jeffrey B. Robertson
(74) Attorney, Agent, or Firm—Westerman, Hattori, Daniels & Adrian, LLP

(57) ABSTRACT

The present invention provides a novel sealant and a novel curable resin composition providing for sufficiently high mechanical strength, adhesive strength, rubber elasticity and good workability and a direct glazing method utilizing the composition, which comprises (I) a reactive silicon group-containing polyether oligomer such that the reactive silicon group exists exclusively at the molecular chain terminus and the introduction rate of the reactive silicon group into the molecular chain terminus is not less than 85% as determined by $^1$H-NMR analysis and (II) a reinforcing filler.

11 Claims, No Drawings

CURABLE RESIN COMPOSITION

TECHNICAL FIELD

The present invention relates to a novel sealant composition containing a reinforcing filler and a method of equipping a vehicle with glass by direct glazing with the composition.

BACKGROUND ART

The glass for fixed. windows, such as the windshield and rear-window of a vehicle, is installed on the automotive body more often than not by the method called "direct glazing". Direct glazing is a method of equipping automotive bodies with glass directly using a sealant having a high adhesive strength (which may be called an "adhesive" as well).

The sealant used for such direct glazing for vehicles is required to have the following characteristics.

(1) The sealant itself must have a high mechanical strength so that it will not be easily destroyed, namely a tensile strength at break of not less than 3 MPa;
(2) A high adhesive strength can be established between the glass and the sealant or between the automotive body and the sealant;
(3) The sealant must have an adequate degree of hardness and yet a sufficient degree of rubber elasticity to preclude the transmission of vibrations and shocks to the glass, namely a 100% modulus of not less than 1 MPa and an elongation at break of not less than 200%;
(4) For quick glazing, the sealant must cure quickly after the glass is set in position on the body, specifically undergoing surface curing in about 10 to 55 minutes of standing in the air at room temperature;
(5) For early expression of physical properties after installation, the depth curing of the sealant should be rapid; the sealant should specifically cure down to not less than 4 mm from the surface in one day.

Today, as the sealant for direct glazing, moisture-curable urethane sealants are in use and no sealant that may replace them has been commercially developed as yet.

Aside from urethane sealants, a curable resin composition comprising a crosslinkable silyl group-containing oxyalkylene polymer, carbon black and a crosslinkable group-free oxyalkylenenpolymer has been disclosed (WO 97/13820). However, this literature does not teach the proper introduction rate of a crosslinkable silyl group in the crosslinkable silyl group-containing oxyalkylene polymer or the adhesive strength of the composition.

SUMMARY OF THE INVENTION

The object of the present invention is to provide a novel sealant that may replace the urethane sealant and a direct glazing method using the novel sealant. Stated differently, the invention relates to a novel curable resin composition providing for sufficiently high mechanical strength, adhesive strength, rubber elasticity and good workability and a direct glazing method utilizing the composition.

As such, the first aspect of the invention is concerned with a curable resin composition
which comprises
(I) a reactive silicon group-containing polyether oligomer such that the reactive silicon group exists exclusively at the molecular chain terminus and that the introduction rate of the reactive silicon group into the molecular chain terminus is not less than 85% as determined by $^1$H-NMR analysis
and (II) a reinforcing filler.

The second aspect of the invention is concerned with a direct glazing method for directly equipping a vehicle with glass using a sealant,
wherein said curable resin composition is used as said sealant.

The present invention is now described in detail.

DISCLOSURE OF THE INVENTION

The reactive silicon group-containing polyether oligomer (I) for use in the curable resin composition of the present invention should be such that the reactive silicon group exists exclusively at the molecular chain terminus and that the introduction rate of the reactive silicon group is not less than 85% as determined by $^1$H-NMR analysis.

The term "reactive silicon group" in the context of the present invention means any group capable of forming a siloxane bond upon inter-group condensation and, as such, is not particularly restricted. However, the group represented by the following general formula (1) can be mentioned as a preferred example.

$$—(Si(R^1_{2-b})(X_b)O)_m Si(R^2_{3-a})X_a \tag{1}$$

(wherein $R^1$ and $R^2$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$—; when two or more $R^1$ or $R^2$ groups are present, they may be the same or different; R' represents a monovalent hydrocarbon group containing 1 to 20 carbon atoms and the three R' groups may be the same or different; X represents a hydroxyl group or a hydrolyzable group and when two or more X groups are present, they may be the same or different; a represents 0, 1, 2 or 3 and b represents 0, 1 or 2; as regards b in —Si($R^1_{2-b}$)($X_b$)O— which occurs in m repeats, the value of b may be the same or different over the repeats; m represents an integer of 0 to 19; with the condition that the relation of a +Σb≧1 is satisfied).

Referring to the above general formula (1), $R^1$ and $R^2$ each may be an alkyl group such as methyl and ethyl; a cycloalkyl group such as cyclohexyl; an Aryl group such as phenyl; an aralkyl group such as benzyl; or a triorganosiloxy group represented by the formula $(R')_3SiO$— wherein R' is methyl or phenyl, for instance. Particularly preferred for $R^1$, $R^2$ and R' are methyl.

The hydrolyzable group mentioned above for X is not particularly restricted but can be a known hydrolyzable group. Thus, for example, hydrogen, halogen, alkoxy, acyloxy, ketoximate, amino, amido, acid amido, aminoxy, mercapto and alkenyloxy can be mentioned. In view of mild hydrolyzability and ease of handling, alkoxy groups such as methoxy, ethoxy, propoxy and isopropoxy are preferred.

The hydroxyl group and/or hydrolyzable group may be attached, in a varying number of 1 to 3, to one silicon atom but the (a +Σb) value, namely the total number of hydroxyl and hydrolyzable groups occurring per reactive silicon group is preferably in the range of 1 to 5. When two or more hydroxyl and/or hydrolyzable groups exist in the reactive silicon group, they may be the same or different.

The number of silicon atoms in the reactive silicon group may be one or not less than two but, in the case of the reactive silicon group in which silicon atoms are linked by siloxane bonding or the like, may be about 20 at the maximum.

Among various reactive silicon groups, those of the following general formula (8) are preferred from availability points of view.

(wherein $R^2$, X and a are as defined above)

The introduction rate of such a reactive silicon group may be determined by various techniques but, in the context of the present invention, is the value found by $^1$H-NMR analysis of the reactive silicon group-containing polyether oligomer (1) The introduction rate of the reactive silicon group can be defined as the value found by determining the proportions of the termini into which the reactive silicon group has been introduced and the molecular chain termini into which the reactive silicon group has not been introduced from $^1$H-NMR data and calculating the percentage of the termini into which the reactive silicon group has been introduced based on the total population of molecular chain termini.

In the reactive silicon group-containing polyether oligomer to be used in the present invention, the introduction rate of the reactive silicon group into the molecular chain terminus as determined by $^1$H-NMR analysis is not less than 85% and, to provide for further improvements in physical properties, is preferably not less than 90%.

The curable resin composition comprising a reactive silicon group-containing polyether oligomer with a terminal introduction rate of the reactive silicon group of not less than 85% not only insures good physical properties required of a sealant (tensile strength at break, elongation at break, cure speed, etc.) but also displays an outstanding adhesive strength. When said introduction rate is less than 85%, the effects of the invention (a high adhesive strength in particular) cannot be obtained. Heretofore, the relationship of the introduction rate of the reactive silicon group to various physical properties, particularly adhesive strength, has not been known. This has just been elucidated by the present inventors for the First time. The present invention is based on this finding.

The main chain structure of the reactive silicon group-containing polyether oligomer (I) need only be a structure having a repeating unit of —R—O— wherein R may be a divalent organic group containing 1 to 20 carbon atoms and at least one member selected from the group consisting of hydrogen, oxygen and nitrogen as a constituent atom. Moreover, the oligomer may be a homopolymer in which all repeating units are the same or a copolymer having 2 or more kinds of repeating units. The main chain may even have a branched structure.

The main chain structure of the reactive silicon group-containing polyether oligomer (I), as such, can be synthesized by the ring-opening polymerization of a substituted or unsubstituted epoxy compound having 2 to 12 carbon atoms using a dihydric or polyhydric alcohol or one of various hydroxyl-containing oligomers as the initiator in the presence of one of various catalysts.

The epoxy compound mentioned above is not particularly restricted but includes alkylene oxides, e.g. ethylene oxide, propylene oxide, α-butylene oxide, β-butylene oxide, hexene oxide, cyclohexene oxide, styrene oxide, α-methylstyrene oxide, etc.; and alkyl, allyl or aryl glycidyl ethers, e.g. methyl glycidyl ether, ethyl glycidyl ether, isopropyl glycidyl ether, butyl glycidyl ether, allyl glycidyl ether, phenyl glycidyl ether, and so on. The preferred, among them, are alkylene oxides. It is particularly preferable that the main chain of reactive silicon group-containing polyether oligomer (I) is predominantly composed of polypropylene oxide. Meant by, the term "predominantly composed of polypropylene oxide" is that polypropylene oxide accounts for not less than 50%, preferably not less than 70%, more preferably not less than 90%, of all the repeating units constituting the main chain structure.

The initiator mentioned above is not particularly restricted but includes ethylene glycol, propylene glycol, butanediol, hexamethylene glycol, methallyl alcohol, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerol, trimethylolmethane, trimethylolpropane and pentaerythritol, among others.

The catalyst for said ring-opening polymerization can be selected from among known catalysts, namely alkaline catalysts such as KOH, NAOH, etc.; acidic catalysts such as trifluoroborane-etherate etc.; aluminoporphyrin complex and double metal cyanide complex catalysts such as zinc cobalt cyanide-glyme complex catalyst etc. can be employed. The use of a double metal cyanide complex catalyst with a low risk for side reactions is particularly preferred, although it is not an exclusive choice.

Particularly preferred as the reactive silicon group-containing polyether oligomer (I) is one derived from a polyether oligomer obtainable by the ring-opening addition polymerization of an alkylene oxide in the presence of a double metal cyanide complex catalyst.

The reactive silicon group-containing polyether oligomer (I) preferably has a number average molecular weight of not less than 10,000.

Such a reactive. silicon group-containing polyether oligomer (I) can be obtained, for example by reacting (a) a polyether oligomer having a main chain comprised of a polyether and containing at least one unsaturated group represented by the general formula (2):

(wherein $R^3$ represents a hydrocarbon group containing up to 10 carbon atoms and $R^4$ represents a divalent organic group containing 1 to 20 carbon atoms and at least one member selected from the group consisting of hydrogen, oxygen and nitrogen as a constituent atom) or the general formula (3):

(wherein $R^3$ and $R^4$ are as defined above) per molecule with a reactive silicon group-containing compound (b) in the presence of a group VIII transition metal catalyst (c)

Referring to the above general formula (2) or (3), $R^3$ may for example be a straight-chain alkyl group, such as methyl, ethyl, propyl, butyl, pentyl, hexyl, heptyl, octyl, nonyl and decyl; a branched-chain alkyl group, such as isopropyl, isobutyl, isopentyl and isohexyl; or an aryl group, such as phenyl. The group may be of only one kind or of more than one kind. From the standpoint of reactivity, $CH_3$— and $CH_3CH_2$— are preferred and $CH_3$— is particularly preferred.

$R^4$ is a divalent organic group containing 1 to 20 carbon atoms and at least one member selected from the group consisting of hydrogen, oxygen and nitrogen as a constituent atom and includes —$CH_2$—, —$C_2H_4$—, —$C_3H_6$—, —$C_4H_8$—, —$C_5H_{10}$—, —$C_6H_4$—, —$C_6H_{12}$—, —$C_7H_{14}$—, —$C_8H_{16}$—, —$C_9H_{18}$—, —$C_{10}H_{20}$—, —CH $(CH_3)$—, —$CH_2$—$CH(CH_3)$—, —$CH_2$—$CH(CH_3)$—$CH_2$—, —$C_2H_4$—$CH(CH_3)$—, —$CH_2$—$C_6H_4$—, —$CH_2$—$C_6H_4$—$CH_2$— and —$CH_2H_4$—$C_6H_4$—. In terms of the ease of synthesis, —$CH_2$—, —$C_2H_4$— or —$CH_2$—$CH(CH_3)$— is preferred. In addition, preferred is —$CH_2$— from availability points of view.

As specific unsaturated groups represented by the above general formula (2) or (3), there can be mentioned $H_2C=C(CH_3)$—$CH_2$—$O$—, $H_2C=C(CH_2CH_3)$—$CH_2$—$O$—, $H_2C=C(CH_2CH(CH_3))$—$CH_2$—$O$— and $HC(CH_3)=CH$—$CH_2$—$O$—, among others. From reactivity points of view, in particular, $H_2C=C(CH_3)$—$CH_2$—$O$— or $HC(CH_3)=CH$—$CH_2$—$O$—is preferred. Especially preferred is $H_2C=C(CH_3)$—$CH_2$—$O$— from availability points of view and in terms of the ease of synthesis.

Regarding the technology of introducing such an unsaturated group into the hydroxy-terminated polyether oligomer obtained by said ring-opening addition polymerization to synthesize the (a) component, various known methods can be utilized. For example, the hydroxy-terminated polyether oligomer is reacted with a compound having an unsaturated group to introduce the unsaturated group by way of ether bonding, ester bonding, urethane bonding or carbonate bonding. To introduce an unsaturated group by ether bonding, there can for example be used a process which comprises converting the terminal hydroxyl group of the polyether oligomer to the metal oxide group —OM (M=Na or K) and, then, reacting the thus-treated oligomer with an organohalogen compound represented by the general formula (6):

(wherein $R^3$ represents a hydrocarbon group containing up to 10 carbon atoms; $R^4$ represents a divalent organic group containing 1 to 20 carbon atoms and at least one member selected from the group consisting of hydrogen, oxygen and nitrogen as a constituent atom; X represents a halogen atom) or the general formula (7)

(wherein $R^3$ represents a hydrocarbon group containing up to 10 carbon atoms; $R^4$ represents a divalent organic group containing 1 to 20 carbon atoms and at least one member selected from the group consisting of hydrogen, oxygen and nitrogen as a constituent atom; X represents a halogen atom) to thereby synthesize a polyether terminating in the unsaturated group.

The molecular weight of he polyether oligomer (a) is not particularly restricted but its number average molecular weight is preferably in the range of 1,000 to 100,000. When the number average molecular weight is less than 1,000, the cured product of the reactive silicon group-containing polyether oligomer (I) is brittle. On the other hand, when it exceeds 100,000, the concentration of the functional group is so low that the cure speed is decreased and, moreover, the polymer is increased so much in viscosity that it cannot be easily handled. For the expression of useful mechanical properties, an oligomer having a number average molecular weight in the range of 10,000 to 50,000 is particularly preferred.

In this specification, the number average molecular weight is defined as the molecular weight value found by a direct titrimetric terminal-group determination based on the principle of the method for determination of the hydroxyl value as directed in JIS K1557 or the method for determination of the iodine value as directed in JIS K0070 and taking the structure of the polyether oligomer into consideration. An indirect method which can also be used for the determination of number average molecular weight comprises constructing a calibration curve from the polystyrene equivalent molecular weight determined by the standard GPC method and the above terminal-group molecular weight and converting the GPC molecular weight to the terminal-group molecular weight.

The reactive silicon group-containing compound (b) for use in the production of reactive silicon group-containing polyether oligomer (I) need only to have at least one silicon group bound to said hydroxyl and/or hydrolyzable group and at least one Si-H group per molecule. As representative examples, compounds of the following general formula (9) can be mentioned.

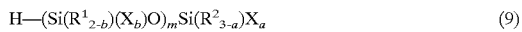

(wherein $R^1$, $R^2$, X, a, b and m have the same meanings as defined in the general formula (1))

Specifically, there can be mentioned halosilanes such as trichlorosilane, methyldichlorosilane, dimethylchlorosilane, phenyldichlorosilane, trimethylsiloxymethylchlorosilane, 1,1,3,3-tetramethyl-1-bromodisiloxane, etc.; alkoxysilanes such as trimethoxysilane, triethoxysilane, methyldiethoxysilane, methyldimethoxysilane, phenyldimethoxysilane, trimethylsiloxymethylmethoxysilane, trimethylsiloxydiethoxysilane, etc.; acyloxysilanes such as methyldiacetoxysilane, phenyldiacetoxysilane, triacetoxysilane, trimethylsiloxymethylacetoxysilane, trimethylsiloxydiacetoxysilane, etc.; ketoximatesilanes such as bis(dimethylketoximate)methylsilane, bis(cyclohexylketoximate)methylsilane, bis(diethylketoximate)trimethylsiloxysilane, bis(methylethylketoximate)methylsilane, tris(acetoximate)silane, etc.; and alkenyloxysilanes such as methylisopropenyloxysilane, among others. Among these, alkoxysilanes are preferred, and as to species of the alkoxy substituent, methoxy is particularly preferred.

Furthermore, in the present invention, the hydrolyzable group X in the terminal silyl group can be converted to another hydrolyzable group Y. Particularly when the X group is halogen, it is preferred to convert it to another hydrolyzable group because the halogen gives rise to the hydrogen halide having a highly irritating odor during moisture curing. The hydrolyzable functional group to which such conversion can be made includes alkoxy, acyloxy, ketoximate, amido, acid amido, aminoxy and mercapto, among others.

A variety of methods can be used for the conversion of a halogen functional group to such a hydrolyzable functional group. The method for conversion to an alkoxy group, for instance, includes a process in which the halogen functional group is caused to react with ① an alcohol or a phenol, such as methanol, ethanol, 2-methoxyethanol, sec-butanol, tert-butanol, phenol and the like, ② an alkoxide from an alcohol or a phenol with sodium, potassium, lithium or the like, ③ an orthoformic acid ester such as methyl orthoformate, ethyl orthoformate and the like, or ④ an epoxy compound such as ethylene oxide, propylene oxide, allyl glycidyl ether and the like. Particularly, the reaction system corresponding to a combination of ① and ③, i.e. an alcohol or a phenol and an orthoformic acid ester, and she reaction system corresponding to a combination of ① and ④, i.e. an alcohol or a phenol and an epoxy compound facilitate the reaction and provide for more satisfactory results. Similarly, the method for conversion to an acyloxy group specifically includes a process in which the halogen functional group is caused to react with ① a carboxylic acid, such as acetic acid and propionic acid, ② an acid anhydride, such as acetic anhydride, or ③ the salt of a carboxylic acid with sodium, potassium or lithium. Similarly, the method for conversion to an aminoxy group includes a process in which the halogen functional group is caused to react with ① a hydroxylamine compound, such as N,N-dimethylhydroxylamine, N,N-diethylhydroxylamine, N,N-methylphenylhydroxylamine and N-hydroxylpyrrolidine, or ② the salt of such a hydroxylamine with sodium, potassium and lithium. Similarly, the method for conversion to an amido group includes a process in which the halogen functional group is caused to react with ① a primary or secondary amine, such as N,N-dimethylamine, N,N-diethylamine, N-methylphenylamine and pyrrolidine, or ② the salt of such a primary or secondary amine with sodium, potassium or lithium. Similarly the method for conversion to an acid amide includes but is not limited to a process in which the halogen functional group is caused to react with ① an acid amide having at least one hydrogen atom on the nitrogen atom, such as acetamide, formamide or propionamide, or ② the salt of such an acid amide with sodium, potassium or lithium. The use of a reaction system corresponding to a combination of a ketoxime, such as acetoxime and methyl ethyl ketoxime; or a mercaptan compound, such as N-octylmercaptan and t-butylmercaptan, with an orthoformic aced ester or an epoxy compound results in the conversion, in part, to a ketoximate group or a mercapto group and, in part, to an alkoxy group derived from the orthoformic acid ester or epoxy compound. Such conversion to another hydrolyzable functional group is not only applicable to said conversion of a halogen functional group but also applicable to the conversion of various hydrolyzable functional groups to other hydrolyzable functional groups.

As the group VIII transition metal catalyst (c) for use in the production of said reactive silicon group-containing polyether oligomer (I), a metal complex catalyst comprising a metal selected from the group consisting of group VIII transition metal elements such as platinum, rhodium, cobalt, palladium and nickel can be effectively employed. Thus, for example, $H_2PtCl_6 \cdot 6H_2O$, platinum-vinylsiloxane complexes, platinum-olefin complexes, Pt metal, and various other compounds such as $RhCl (PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, etc. can be employed. However, in terms of the efficiency of hydrosilylation reaction, the use of a platinum-vinylsiloxane complex or a platinum-olefin complex is particularly preferred. The platinum-vinylsiloxane complex mentioned herein is a generic term denoting various compounds having a vinyl-containing siloxane, polysiloxane or cyclic siloxane group as the ligand to a platinum atom, thus including i,1,3,3-tetramethyl-1,3-divinyldisiloxane, 1,3,5,7-tetramethyl-1,3,5,7-tetravinylcyclotetrasiloxane and so on. As specific examples of the olefin ligand of said platinum-olefin complex, there can be mentioned 1,5-hexadiene, 1,7-octadiene, 1,9-decadiene, 1,11-dodecadiene, 1,5-cyclooctadiene and so on. Particularly preferred, among these ligands, is 1,9-decadiene.

The platinum-vinylsiloxane complexes and platinum-olefin complexes are disclosed in Japanese Kokoku Publication Hei-8-9006.

The amount of use of the catalyst is not particularly restricted but it is generally preferable to use $10^{-1}$ to $10^{-8}$ mole of the platinum catalyst per mole of the alkenyl group, and the more preferred range is $10^{-3}$ to $10^{-6}$ mole. When the amount of the catalyst is too small, the hydrosilylation reaction may not proceed sufficiently. Use of the catalyst in an excessively large amount. leads to an increased cost burden and an increased is catalyst residue in the product.

The hydrosilylation reaction for the production of reactive silicon group-containing polyether oligomer (I) is usually carried out in the temperature range of 10 to 150° C., preferably at 20 to 120° C., more preferably at 40 to 100 ° C.

The hydrosilylation reaction according to the invention can be carried out in the absence of a solvent or in the presence of a solvent. The hydrosilylation solvent can be usually selected from among hydrocarbons, halogenated hydrocarbons, ethers and esters, although the use of heptane, hexane, benzene, toluene or xylene is preferred. Particularly, the hydrosilylation of a polymer compound is preferably carried out in the presence of a solvent for liquidity and viscosity reduction. The plasticizer to be formulated in the production stage for products of he polymer compound can also be used as the solvent.

For accelerating the hydrosilylation reaction, reactivation of the catalyst with oxygen (Japanese Kokai Publication Hei-8-283339) or addition of sulfur is preferred. The addition of sulfur leads to a curtailed production time without involving a cost increase due to an increased consumption of the platinum catalyst and the consequent need for removal of catalyst residues, thus contributing to reduced production cost and enhanced productivity.

The sulfur compound for use includes elemental sulfur, thiols, sulfides, sulfoxides, sulfones and thioketones. Elemental sulfur is preferred, although it is not an exclusive choice. In adding a sulfur compound to the liquid-phase reaction system, it is possible to dissolve the compound in advance, for example in a portion of the reaction mixture or solvent, for it can then be uniformly dispersed throughout the system. For example, the sulfur compound can be dissolved in an organic solvent such as toluene, hexane and xylene and then added.

The addition amount of the sulfur compound may be selected within the range of 0.1 to 10 molar equivalents relative to the metal catalyst, $10^{-3}$ to $10^{-6}$ molar equivalents relative to the alkenyl group, or 0.001 to 10 ppm based on the total weight of the reaction mixture. If the addition amount is too low, the effect of the invention may not he sufficiently expressed. Conversely if the amount of the sulfur compound is too high, the catalyst activity may be decreased or the progress of reaction may be inhibited. Therefore, it is preferred to select the addition amount appropriately.

The reactor gas phase for the hydrosilylation reaction according to the invention may be exclusively composed of an inert gas, such as nitrogen gas and helium gas, or may contain oxygen or the like. From the standpoint of safety in the handling of inflammable substances, the hydrosilylation reaction is often carried out in the presence of an inert gas such as nitrogen gas and helium gas in the reactor gas phase. However, when the reactor gas phase comprises an inert gas such as nitrogen gas and helium gas, the velocity of hydrosilylation tends to be decreased depending on reaction conditions.

In the hydrosilylation reaction for the production of reactive silicon group-containing polyether oligomer (I), the reaction can be safely accelerated even in the presence of oxygen by setting the oxygen concentration of the reactor gas phase at a level avoiding formation of an explosive mixture. The oxygen concentration of the reactor gas phase may for example be 0.5 to 10%.

In order to preclude the oxidation of the polyether oligomer, reaction solvent and/or the plasticizer in the system by the oxygen of the reactor gas phase, the hydrosilylation reaction can be carried out in the presence of an oxidation inhibitor. The oxidation inhibitor includes phenolic antioxidants having a radical chain inhibitor function, such as 2,6-di-tert-butyl-p-cresol, 2,6-di-tert-butylphenol, 2,4-dimethyl-6-tert-butylphenol, 2,2-methylenebis(4-methyl-6-tert-butylphenol), 4,4-butyridenebis(3-methyl-6-tert-butylphenol), 4,4-thiobis(3-methyl-6-tert-butylphenol), tetrakis(methylene-3(3,3-di-tert-butyl-4-hydroxyphenyl)propionate)methane, and 1,1,3-tris(2-methyl-4-hydroxy-5-tert-butylphenyl)butane, among others. Amine antioxidants having a radical chain inhibitor function as well, such as phenyl-β-naphthylamine, α-naphthylamine, N,N-di-sec-butyl-p-phenylenediamine, phenothiazine and N,N-diphenyl-p-phenylenediamine, can be likewise employed. However, these inhibitors are not exclusive choices.

The reactive silicon group-containing polyether oligomer (I) maybe used singly or two or more of them can be used together.

As the component (I), a modification product derived from the reactive silicon group-containing polyether oligomer can also be employed. As a representative example of such modification product, there can be mentioned the polymer obtainable by polymerizing a mixture of an acrylate and/or methacrylate monomer having an alkyl group containing 1 to 8 carbon atoms as represented by the following general formula (10) with an acrylate and/or methacrylate monomer having an alkyl group containing 10 or more carbon atoms as represented by the following general formula (11) in the presence of the reactive silicon group-containing polyether oligomer. By using such a modification product, the weather resistance of the cured product available from the curable resin composition can be improved.

$C_2=C(R^5)(COOR^6)$ (10)

(wherein $R^5$ represents a hydrogen atom or a methyl group; $R^6$ represents an alkyl group containing 1 to 8 carbon atoms)

$CH_2=C(R^5)(COOR^7)$ (11)

(wherein $R^5$ is as defined above; $R^6$ represents an alkyl group containing not less than 10 carbon atoms)

Referring to the above general formula (10), $R^6$ is an alkyl group containing 1 to 8 carbon atoms such as methyl, ethyl, propyl, n-butyl, t-butyl, 2-ethylhexyl and the like, preferably an alkyl group containing 1 to 4 carbon atoms, more preferably an alkyl group containing 1 to 2 carbon atoms. The monomer represented by the general formula (10) may be used singly or two or more of them may be used together.

Referring to the above general formula (11), $R^7$ is an alkyl group containing 10 or more carbon atoms, such as lauryl, tridecyl, cetyl, stearyl, biphenyl, etc., usually a long-chain alkyl group of 10 to 30 carbon atoms, preferably 10 to 20 carbon atoms. The monomer represented by the general formula (11) may be used singly or two or more of them may be used together.

The formulating ratio of the monomer (10) and monomer (11) is preferably 95:5 to 40:60, more preferably 90:10 to 60:40 by weight.

In conducting this polymerization, a monomer or monomers other than those of formula (10) and formula (11) may also be used. As such monomers, there can be mentioned acrylic acids such as acrylic acid and methacrylic acid; amido-containing monomers such as acrylamide, methacrylamide, N-methylolacrylamide, N-methylolmethacrylamide, etc.; epoxy-containing monomers such as glycidyl acrylate, glycidyl methacrylate, etc.; amino-containing monomers such as diethylaminoethyl acrylate, diethylaminoethyl methacrylate, etc.; acrylonitrile, styrene, α-methylstyrene, alkyl vinyl ethers, vinyl chloride, vinyl acetate, vinyl propionate and ethylene, among others. In such cases, it is preferred to see to it that the combined amount of the monomers of formula (10) and formula (11) polymerized will account for not less than 50 weight %, particularly not less than 70 weight %, of the whole monomer polymerized.

The reactive silicon group-containing polyether oligomer (I) thus synthesized undergoes curing in the presence of a curing catalyst in response to atmospheric moisture at ordinary temperature to give a coating film highly adhesive on a metal, glass or other substrate, thus finding application in the coating composition, sealant composition, coating composition or adhesive composition for use in the fields of buildings, aircraft and automobiles, among other applications. As the curing catalyst mentioned above, any of the known silanol condensation catalysts can be used. These catalysts may be used singly or two or more of them can be used together.

The reinforcing filler as the (II) component in the present invention is generally a material known as a rubber reinforcing filler and various known materials can be employed. The (II) component improves the dynamic properties of the cured product, increasing its elastic rate (modulus) and strength at break, and, therefore, is essential for the application to an automotive glass sealant which is required to have strength.

As specific examples of the (II) component, there can be mentioned carbon black, e.g. channel black, furnace black, thermal black, lamp black, acetylene black, etc.; silica, e.g. fused silica, precipitated silica, etc.; and calcium carbonate, among others. These materials for (II) component may be used singly or in a suitable combination of plural kinds.

The amount of use of this (II) component is preferably in the range of 0.1 to 500 weight parts, more preferably 10 to 200 parts, relative to 100 weight parts of the polyether oligomer (I). At an amount below 0.1 part, the expected effect can hardly be expressed. Exceeding the amount of 500 parts is undesirable, adverse effects for workability and the dynamic characteristics of the cured product would then be caused.

The curable resin composition of the present invention may be supplemented with various other components such as the plasticizer, filler, solvent and other additives.

As specific examples of the plasticizer, there can be mentioned phthalic acid esters such as dibutyl phthalate, diheptyl phthalate, di(2-ethylhexyl)phthalate, butyl benzyl phthalate, butyl phthalylbutyl glycolate, etc.; non-aromatic dibasic acid esters such as dioctyl adipate, dioctyl sebacate, etc.; and phosphoric acid esters such as tricresyl phosphate, tributyl phosphate and so on. As plasticizers of comparatively high molecular weight, there can be mentioned polyester types, such as the polyester from a dibasic acid and a dihydric alcohol; polyester types such as poly(propylene glycol) and its derivatives, and polystyrene types such as poly(α-methylstyrene) and polystyrene, among others.

Particularly for inhibiting decreases in storage stability and cure speed after storage, the use of a polyether is preferred.

These plasticizers can be used singly or in admixture. The plasticizer is used in a proportion of about 20 to 400 weight parts relative to 100 weight parts of the reactive silicon group-containing polyether oligomer (I).

As examples of the filler mentioned above, there can be mentioned inorganic fillers such as woodmeal, walnut shell flour, rice hull flour, pulp, cotton chips, mica, graphite, diatomaceous earth, acid clay, kaolin, clay, talc, silicic anhydride, quartz powder, aluminum powder, zinc dust, asbestos, glass fiber, carbon fiber, glass beads, magnesium carbonate, titanium oxide, alumina, glass balloons, silas balloons, silica balloons, calcium oxide, magnesium oxide, silicon oxide, etc. and organic fillers such as powdered rubber, reclaimed rubber, finely divided thermoplastic or thermosetting resin powder, and hollow beads of polyethylene or the like, among others. These fillers can be used singly or in a suitable combination.

From workability points of view, the amount of use of fillers other than the reinforcing filler is preferably about 3 to 300 weight parts, more preferably about 10 to 150 weight parts, relative to 100 weight parts of the polyether oligomer (I).

The solvent mentioned above is not particularly restricted as far as it is a non-reactive solvent, thus including hydrocarbons such as toluene, xylene, n-hexane, cyclohexane, etc.; acetic acid esters such as ethyl acetate, butyl acetate, etc.; alcohols such as methanol, ethanol, isopropanol, n-butanol, etc.; ethers such as ethyl-cellosolve, butyl-cellosolve, cellosolve acetate, etc.; and ketones such as methyl ethyl ketone, ethyl acetoacetate, acetyl acetone, diacetone alcohol, methyl isobutyl ketone, acetone, cyclohexanone, cyclooctanone, etc., among others.

As the other additives mentioned above, there can be used an antisagging agent, such as hydrogenated castor oil, organic bentonite and calcium stearate, a colorant, an aging inhibitor such as a UV absorber or a light stabilizer, an adhesion-imparting agent, a higher fatty acid salt or higher fatty acid ester as a processing aid to carbon black, and so on.

The technology of producing the curable resin composition comprising said (I) and (II) components according to the invention is not particularly restricted but may for example be the per se known process comprising formulating said (I) and (II) components and kneading them together by means of a mixer, a roll, a kneader or the like or the conventional process comprising dissolving each of said components in a solvent and blending the resulting solutions. The present composition may be provided as whichever of a one-component system and a two-component system.

For equipping a vehicle with glass, the known techniques can be utilized.

Usually, the glass for a fixed window such as the windshield and rear window of a car is directly fixed to the automotive body by the so-called direct grazing method using a sealant having a high adhesive strength (which may be called an adhesive as well).

The sealant according to the present invention meets the following requirements.

(1) The sealant itself must have a high mechanical strength so that it will not be easily destroyed, namely a tensile strength at break of not less than 3 MPa;
(2) A high adhesive strength can be established between the glass and the sealant or between the automotive body and the sealant;
(3) The sealant must have an adequate degree of hardness and yet a sufficient degree of rubber elasticity to preclude the transmission of vibrations and shocks to the glass, namely a 100% modulus of not less than 1 MPa and an elongation at break of no less than 200%;
(4) For quick glazing, the sealant must cure quickly after the glass is set in position on the body, specifically undergoing surface curing in about 10 to 45 minutes of standing in the air at room temperature;
(5) For early expression of physical properties after installation, the depth curing of the sealant should be rapid; the sealant specifically curing down to not less than 4 mm from the surface in one day.

BEST MODE FOR CARRYING OUT THE INVENTION

The following examples are intended to describe the present invention in further detail and should by no means be construed as defining the scope of the invention.

EXAMPLE OF SYNTHESIS

Using poly(propylene triol) as the initiator and zinc hexacyanocobaltate-glyme complex as the catalyst, polypropylene oxide was polymerized to give a hydroxyl-terminated polyether oligomer having a molecular weight of 20,000. With respect to the hydroxyl group of the oligomer, 1.2 equivalents of NaOMe/methanol was added and after the methanol was distilled off, 3-chloro-2-methyl-1-propene was added so as to convert the terminal hydroxyl group to a methallyl group. To 100 g of this oligomer was added 10 g of hexane and the water was azeotropically distilled off at 90° C. The hexane was then distilled off under reduced pressure, and after nitrogen purging, 11 $\mu$l of vinylplatinum catalyst (3 weight % as platinum in xylene) was added. Then, nitrogen gas containing 6 vol % of oxygen was introduced into the reactor gas phase at atmosphericpressure. Under agitation with a magnetic stirrer, a mixture of 0.5 g of 2,6-di-tert-butyl-p-cresol and 55 $\mu$l of sulfur (0.1 weight %)/toluene was added as an antioxidant and 2.5 g of DMS was gradually added dropwise. This mixture was reacted at 90° C. and the reaction was monitored. The silyl group introduction rate was serially measured. As a result, the introduction rate of the dimethoxymethylsilyl group reached 97% in 6 hours. After completion of the reaction, the unreacted DMS was distilled off under reduced pressure. $^1$H NMR analysis of the reaction product revealed that the ratio of the dimethoxymethylsilyl group introduced into the molecular terminus and the propenyl group formed by a side reaction was 98:2.

COMPARATIVE EXAMPLE OF SYNTHESIS

Using polypropylene triol) as the initiator and zinc hexacyanocobaltate-glyme complex as the catalyst, polypropylene oxide was polymerized to give a hydroxyl-terminated polyether oligomer having a molecular weight of 20,000. With respect to the hydroxyl group of the oligomer, 1.2. equivalents of NaOMe/methanol was added and after the methanol was distilled off, allyl chloride was added so as to convert the terminal hydroxyl group to an allyl group. To 100 g of this oligomer was added 10 g of hexane and the water was azeotropically distilled off at 90° C. The hexane was then distilled off under reduced pressure, and after nitrogen purging, 11 $\mu$l of vinylplatinum catalyst (3 weight % as platinum in xylene) was added. Then, nitrogen gas containing 6 vol % of oxygen was introduced into the reactor gas phase at atmospheric pressure. Under agitation with a magnetic stirrer, a mixture of 0.5 g of 2,6-di-tert-butyl-p-cresol and 55 $\mu$l of sulfur (0.1 weight %)/toluene was added as an antioxidant and 2.5 g of DMS was gradually added dropwise. This mixture was reacted at 90° C. and the reaction was monitored. The silyl group introduction rate was serially measured. As a result, the introduction rate of the dimethoxymethylsilyl group reached 75% in 6 hours.

After completion of the reaction, the unreacted DMS was distilled off under reduced pressure. $^1$H NMR analysis of the reaction product revealed that the ratio of the dimethoxymethylsilyl group introduced into the molecular terminus and the propenyl group formed by a side reaction was 80:20.

EXAMPLES 1 AND 2

By adding the formulating agents mentioned in Table 1, curable resin compositions were prepared. Thus, using a planetary mixer, calcium carbonate and carbon black were dried under heating and compounded with the oligomer obtained in Example of Synthesis and other formulating agents.

COMPARATIVE EXAMPLE

Except that, as the reactive silicon group-containing polyether oligomer, the compound obtained in Comparative Example of Comparative Synthesis-1 was used, the same formulating agents as mentioned in Table 1 and used in Example 1 were added to prepare a curable resin composition. Using a planetary mixer, calcium carbonate and carbon black were dried under heating and compounded with the oligomer obtained in Comparative Example of Synthesis and other formulating agents.

TABLE 1

|  |  | Example (phr) | |
|---|---|---|---|
|  |  | 1 | 2 |
| Methyldimethoxysiyl-terminated polyether oligomer (Example of Synthesis) |  | 100 | 100 |
| Plasticizer | PPG plasticizer (Note 1) | 50 | 50 |
| Carbon black | #70, product of Asahi Carbon Co. | 30 | 30 |
| Carbon black | #55, product of Asahi Carbon Co. | 40 | 40 |
| Colloidal Calcium carbonate | Haku-Enka CCR, product of Shiraishi Kogyo Kaisha | 50 | 50 |
| Processing aid | Methyl stearate | 0 | 5 |
| Silanol condensation catalyst | Neostann U-220, product of Nitto Kasei Co. | 2 | 2 |
| UV absorber | Tinuvin 327, product of Ciba-Geigy (Japan) | 1 | 1 |
| Light stabilizer | Sanol LS-770, product of Sankyo Company | 1 | 1 |

Note 1:
Allyloxy-terminated oxypropylene polymer with an average molecular weight of 10000

COMPARATIVE EXAMPLES 2 AND 3

As controls, the hitherto-known repair direct-glazing polyurethane sealants (Comparative Example 2: Essex U-418, Comparative Example 3: 3M repair polyurethane) were evaluated.

The characteristics of curable resin compositions and the physical properties of cured products were evaluated or determined as follows.

(1) Surface Curability

The curable resin composition obtained was poured into an open-top vessel and allowed to cure in the atmosphere of 23° C., 60% RF and the stringiness (webbing) disappearance time (skinning time) was measured.

(2) Dynamic Characteristics

The curable resin composition was spread in a thickness of 3 mm on a polyethylene film and allowed to stand in the atmosphere of 23° C., 60% RH for a predetermined time. The No. 3 dumbbell testpiece was prepared by using this according to JIS K6301 and the tensile characteristics (modulus at 100 elongation (100% modulus) (M100), tensile strength at break (TB) and elongation at break (EB)) were determined at a pulling speed of 200 mm/min.

(3) Depth Curability

The curable resin composition was poured into an opentop vessel and allowed to stand in the atmosphere of 23° C., 60% RH for a predetermined time. The hardened layer was taken out and its thickness in the center was measured as the depth of curing. The larger the thickness is, the greater is depth curability.

(4) Adhesive Strength

Using a ceramic-coated glass plate (25 mm×120 mm×5 mm) and an ED steel sheet (25 mm×100 mm×0.8 mm), the adhesive strength under shear was evaluated according to Paragraph 9.23 of JASO (M338-89) (the exclusive primer was used).

The results of the above evaluations are shown in Table 2.

TABLE 2

|  |  | Example | | Compar. Ex. | | |
|---|---|---|---|---|---|---|
|  |  | 1 | 2 | 1 | 2 | 3 |
| Skinning time (min.) | | 33 | 43 | 19 | 39 | 17 |
| Tensile properties (on day 7) | M100 (MPa) | 1.6 | 1.5 | 1.8 | 2.1 | 2.1 |
| | TB (MPa) | 5.2 | 6.0 | 4.7 | 5.5 | 5.6 |
| | EB (%) | 350 | 420 | 250 | 340 | 410 |
| Depth curability | Day 1 (mm) | 4.8 | 4.9 | 4.5 | 3.0 | 3.5 |
| | Day 2 (mm) | 7.0 | 6.9 | 6.2 | 4.7 | 7.5 |
| Adhesive strength | Strength under shear (MPa) | 4.0 | 4.5 | 2.0 | 3.4 | 3.2 |

Example 1 and Comparative Example 1 represent curable resin compositions which are different only in the introduction rate of a reactive silicon group into the resin. However, in Example 1, both tensile properties and depth curability were improved and adhesive strength was increased considerably, i.e. doubled, as compared with Comparative Example 1. Example 2 was identical to Example 1 except that a processing aid was formulated in the former. Here, improvements in physical properties were noted as compared with Example 1. Moreover, even compared with Comparative Examples 2 and 3 which represent the conventional urethane sealants, Examples 1 and 2 are fully comparable and even superior in some physical aspects.

Thus, it can be seen from Table 2 that the cured product obtainable from the curable resin composition of the present invention has sufficient tensile strength at break and elongation at break (rubber elasticity) in good balance to qualify it as an automotive direct-glazing sealant. It was also found that the composition has a high adhesive strength and a sufficiently high cure speed for use as a direct-glazing sealant.

INDUSTRIAL APPLICABILITY

Comprised of a reactive silicon group-containing polyether oligomer in which the reactive silicon group exists exclusively at the molecular chain terminus ad the introduction rare of the reactive silicon group into the molecular chain terminus is not less than 85% as determined by $^1$H-NMR analysis as a curable component, the curable resin composition of the present invention provides for sufficient strength and elongation in good balance, imparting useful tensile strength and elongation at break to the cured product, as well as fast cure speed and high adhesive strength, so that it is suited for use in providing glass by the direct glazing method.

What is claimed is:

1. A curable resin composition which comprises
   (I) a reactive silicon group-containing polyether oligomer such that the reactive silicon group exists exclusively at the molecular chain terminus and that the introduction rate of the reactive silicon group into the molecular terminus is not less than 90% as determined by $^1$H-NMR analysis, and
   (II) a reinforcing filler, wherein the reactive silicon group-containing polyether oligomer (I) is obtained by reacting
   (a) a polyether oligomer the main chain of which comprises a polyether and which contains at least one unsaturated group represented by the general formula (2) or the general formula (3):

$$H_2C=C(R^3)-R^4-O- \qquad (2)$$

$$HC(R^3)=CH-R^4-O- \qquad (3)$$

wherein $R^3$ represents a hydrocarbon group containing up to 10 carbon atoms and $R^4$ represents a divalent organic group containing 1 to 20 carbon atoms and at least one member selected from the group consisting of hydrogen, oxygen and nitrogen as a constituent atom, per molecule, with
   (b) a reactive silicon group-containing compound in the presence of
   (c) a group VIII transition metal catalyst.

2. The curable resin composition according to claim 1 wherein the reactive silicon group of the reactive silicon group-containing polyether oligomer (I) is represented by the general formula (1):

$$-(Si(R^1{}_{2-b})(X_b)O)_m Si(R^2{}_{3-a})Xa \qquad (1)$$

wherein $R^1$ and $R^2$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$; when two or more $R^1$ or $R^2$ groups are present. They may be the same or different; R' represents a monovalent hydrocarbon group containing 1 to 20 carbon atoms and the three R' groups may be the same or different; X represents a hydroxyl group or a hydrolysable group and when two or more X groups are present, they may be the same or different; a represents 0, 1, 2 or 3 and b represents 0, 1 or 2; as regards b in $-Si(R^1{}_{2-b})(X_b)O-$ occurring in m repeats, the value of b may be the same or different over the repeats; m represents an integer of 0 to 19; with the condition that the relation of $a+\Sigma b \geqq 1$ is satisfied.

3. The curable resin composition according to claim 1 or 2 wherein the reactive silicon group-containing polyether oligomer (I) is derived from a polyether oligomer obtained by ring-opening addition polymerization of an alkylene oxide in the presence of a double metal cyanide complex catalyst.

4. The curable resin composition according to claim 1 or 2 wherein the main chain of the reactive silicon group-containing polyether oligomer (I) is mainly formed from polypropylene oxide.

5. The curable resin composition according to claim 1 wherein the group VIII transition metal catalyst (c) is at least one member selected from the group consisting of platinum-vinylsiloxane complexes and platinum-olefin complexes.

6. The curable resin composition according to claim 1 wherein $R^3$ in the general formula (2) or (3) represents $-CH_3$ or $-CH_2CH_3$.

7. The curable resin composition according to claim 6 wherein the unsaturated group of the general formula (2) is represented by the formula (4):

$$H_2C=C(CH_3)-CH_2-O- \qquad (4).$$

8. The curable resin composition according to claim 6 wherein the unsaturated group of the general formula (3) is represented by the formula (5):

$$HC(CH_3)=CH-CH_2-O- \qquad (5).$$

9. The curable resin composition according to claim 1 or 2 wherein the reactive silicon group containing polyether oligomer (I) has a number average molecular weight of not less than 10,000.

10. A direct-glazing method for directly equipping a vehicle with glass using a sealant wherein the curable resin composition according to claim 1 or 2 is used as said sealant.

11. The curable resin composition according to claim 1, wherein the introduction ratio is not than 97%.

* * * * *